United States Patent [19]

Orain

[11] 4,282,722
[45] Aug. 11, 1981

[54] DEVICE FOR PROTECTING IN PARTICULAR THE ARTICULATION AND BEARING OF A TRANSMISSION SHAFT

[75] Inventor: Michel A. Orain, Conflans Ste Honorine, France

[73] Assignee: Glaenzer Spicer, Poissy, France

[21] Appl. No.: 19,898

[22] Filed: Mar. 12, 1979

[30] Foreign Application Priority Data

Apr. 26, 1978 [FR] France ................................ 78 12336

[51] Int. Cl.³ .............................................. F16D 3/84
[52] U.S. Cl. ........................................ 64/32 F; 64/21;
 277/212 FB; 180/254
[58] Field of Search ................... 64/32 R, 32 F, 8, 21,
 64/3, 17 R, 17 A; 277/212 FB; 74/18, 18.1,
 18.2; 308/245; 180/256, 254; 206/318, 384

[56] References Cited

U.S. PATENT DOCUMENTS

| | | | |
|---|---|---|---|
| 2,090,111 | 8/1937 | Creveling | 206/384 |
| 2,331,982 | 10/1943 | Johnson | 64/17 R |
| 2,691,876 | 10/1954 | Wildhaber | 64/21 |
| 2,702,996 | 3/1955 | Davis | 74/18.1 |
| 2,780,080 | 2/1957 | Cork | 64/21 |
| 3,449,965 | 6/1969 | Ross | 74/18.2 |
| 3,795,118 | 3/1974 | Kesk et al. | 64/21 |
| 3,942,336 | 3/1976 | Schultenkamper | 64/32 F |

FOREIGN PATENT DOCUMENTS 2833221 2/1979 Fed. Rep. of Germany ............. 64/21
 826440 1/1960 United Kingdom .................... 180/254

Primary Examiner—Charles J. Myhre
Assistant Examiner—Magdalen Moy
Attorney, Agent, or Firm—Schuyler, Banner, Birch, McKie & Beckett

[57] ABSTRACT

In this device, which is particularly, but not exclusively, suitable for transmissions for vehicles, an elastomer protecting gaiter comprises a body connected by a fold to a mounting flange and by another fold to a neck portion. The latter comprises a ring forming a bearing, an arrangement for mounting the neck portion in a support, and a sealing device. The body of the gaiter is preferably rigid.

16 Claims, 2 Drawing Figures

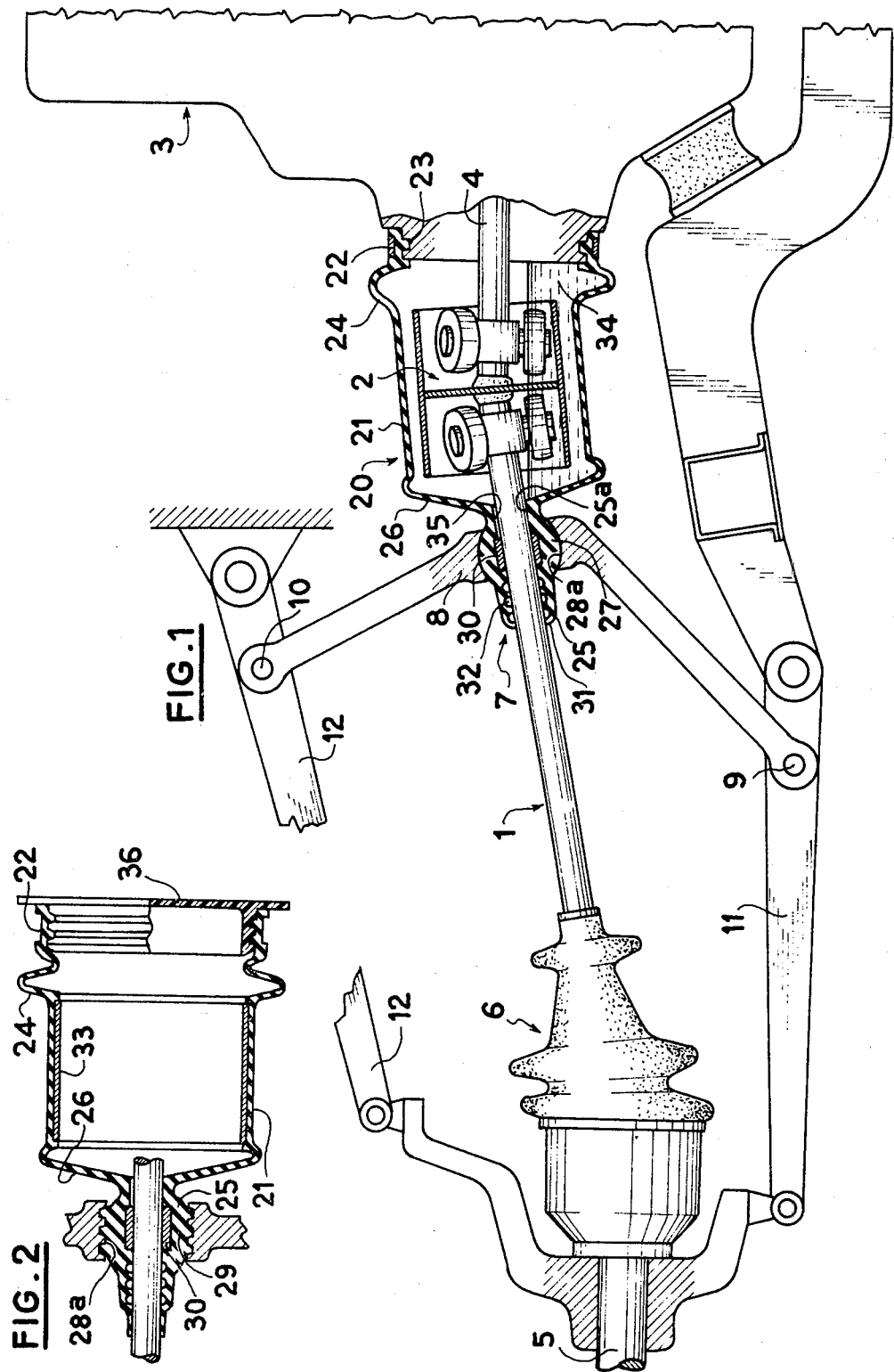

DEVICE FOR PROTECTING IN PARTICULAR THE ARTICULATION AND BEARING OF A TRANSMISSION SHAFT

DESCRIPTION

The present invention relates to gaiters or bellows which may be employed in particular for protecting joints or other articulation devices.

Certain transmission shafts comprise a homokinetic or other articulation device which is located close to an intermediate rolling bearing having a smooth ring and balls, needles or other rolling means. This joint is usually protected by an elastically yieldable enclosure termed a gaiter or bellows which retains the lubricant in which the homokinetic joint is immersed and protects it from exterior agents: dust, rain, mud, various projections, while it allows the angular movement between the two shafts interconnected by the homokinetic joint. The intermediate bearing is by definition isolated from the driving means and from the driven or power receiving means and consequently cannot benefit from the lubricating systems pertaining thereto. There is consequently a problem concerning the lubrication and the protection of this bearing, particularly inasmuch as a smooth bearing is preferred for reasons of size or cost.

An object of the present invention is to provide a gaiter which is strong, simple and cheap in construction and which provides a protection both for an articulation device and for an adjacent bearing.

This result is achieved by means of a gaiter comprising a body adapted to surround the device to be protected, this body being extended, at one end, by a mounting flange to which it is connected by at least one fold and, at its opposite end, by a neck portion provided with means for mounting it in a bearing support, means forming a bearing and sealing means adapted to cooperate with a shaft connected to the device to be protected.

According to other features of the invention:

the body is connected to the neck by at least one fold;

a lubricant passage is provided between the cavity defined by the body and the means forming a bearing;

the body is cylindrical and substantially rigid, this arrangement being achieved, in one embodiment, by means of a rigid sleeve of metal or plastics material which is disposed inside the body which is of elastomer material.

The invention will be described in more detail hereinafter with reference to the accompanying drawing which is given merely by way of example and in which:

FIG. 1 is a partial view of a front set of wheels of a vehicle in which a gaiter according to the invention is incorporated, and FIG. 2 is a detailed view of this gaiter incorporating a few modifications.

FIG. 1 shows a transmission shaft 1 for a front-wheel drive vehicle. A slidable homokinetic joint 2 transmits the power of an engine 3 from a shaft 4 to a shaft 1 which is connected to the stub-axle 5 through a homokinetic joint 6. A bearing 7 which is mounted on a support 8 guides the shaft 1. This support is connected in the presently-described embodiment at 9 and 10 to suspension arms 11 and 12 of the vehicle. It might also be fixed directly to the structure of the vehicle. A protective gaiter or bellows 20 according to the invention comprises a cylindrical body 21 which surrounds the joint 2 with a radial and axial clearance allowing the rotation, the angular movements and the movements in translation of the joint without contact with the walls of this gaiter. The body 20 is extended at one end by a flange 22 which is fixed in a sealed manner at 23 to the engine unit or to a member attached to this unit. At least one fold 24 is provided between the body 21 and the flange 22. At its other end, the body 21 is extended by a neck portion 25 to which it is also connected preferably by at least one fold 26. This neck portion is fixed inside the support 8 either by a substantially part-spherical enlargement 27 received in a cavity 28a of corresponding shape (FIG. 1) or by circular splines or grooves 29 (FIG. 2) which engage splines or ribs formed in the cavity 28a of the support 8. The neck portion of the gaiter defines a guiding and centering zone 25a and carries therein a bearing ring 30 of special anti-friction material. This ring also precludes the radial crushing of the neck portion of the gaiter of elastomer under the effect of the compression exerted on the enlargement 27 by the pre-stressed mounting of the neck portion inside the cavity 28a of the support.

The neck portion extends axially beyond the bearing and its wall gradually tapers so as to constitute sealing means in the form of a flexible lip portion 31 which lightly grips the shaft owing to its elasticity and its circumferential tension. This lip portion may be provided with inner circular grooves 32 which form sealing labyrinths and may receive an outer elastically yieldable ring of rubber or a metal collar (not shown) should its gripping pressure on the shaft be insufficient.

This assembly operates in the following manner:

The gaiter of elastomer does not rotate since it is fixed to stationary parts: namely, the engine unit, and the bearing support 8. This gaiter elastically lends itself to the movements of pivoting and translation of the shaft 1 relative to the engine unit 3 owing to the provision of the fold 24 located close to the point at which it is secured to the engine unit at 23 and the other fold 26 located inside the support 8. The cylindrical median part of the body 21 of the gaiter is preferably relatively rigid so as to avoid coming into contact with the parts of the joint 2. This relative rigidity may be obtained either by providing a thick wall or by employing a sheath or sleeve 33 preferably of metal or plastics material (FIG. 2). This sleeve extends between the two folds 24 and 26 which act as articulations for this rigid zone 21. The level of the lubricant 34 contained in the cavity defined by the gaiter reaches the trunnions of the tripods of the joint 2 (FIG. 1). During the rotation of the joint, this lubricant is projected and distributed throughout the mechanism and flows along the shaft 1 so as to ensure the lubrication of the ring 30 by way of a passage 35 formed in the guiding and centering portion 25a of the gaiter.

The lip portion 31 and the labyrinths 32 of the gaiter preclude any notable leakage of lubricant.

The thickness of the neck portion 25 of the gaiter of elastically yieldable material imparts to the bearing sufficient flexibility for absorbing the angular movements of the shaft 1 with respect to the bearing support 8 and thereby permits an ideal operation of the bearing ring 30 inserted in the neck portion of the bellows or bonded or vulcanized thereto, if necessary when moulding this gaiter.

To summarize, the assembly of the gaiter and bearing in one piece in accordance with the invention combines cheaply and efficiently the following functions:

1. Effective protection of the homokinetic joint or other articulation device and retention of the lubricant. As this gaiter does not rotate with the shaft and is consequently subjected to but little fatigue stress, it is therefore highly reliable and has a long life.

2. Self lubrication of an intermediate bearing.

3. Articulation of a bearing on its support in accordance with the angular movement of the transmission shaft.

Note, furthermore, that for the storage and transportation of the transmission before assembly on the engine, the opening of the gaiter adjacent the flange 22 may be temporarily closed by a plug 36 of plastics material (FIG. 2) which retains the lubricant and protects the mechanism. This plug is easily withdrawn when assembling and used again for the transportation and storage of other transmissions.

Having now described my invention what I claim as new and desire to secure by Letters Patent is:

1. A structure comprising in combination a drive unit having an output shaft, a transmission shaft, an articulation interconnecting the output shaft and the transmission shaft, a support device combined with the unit, a protecting device comprising a gaiter of a deformable material which surrounds the articulation, said gaiter comprising a body surrounding the articulation, a mounting flange extending an end of the body, at least one fold interposed between the body and the flange, an elastomeric neck portion extending an end of the body remote from said mounting flange, means rigidly mounting the flange on the unit, the neck portion having a passageway through which the transmission shaft extends and being combined with the support device so as to be supported by and held longitudinally in position in the support device, a bearing mounted on the transmission shaft and held in the passageway of the neck portion with the elastomeric neck portion interposed between the bearing and the support device and engaging the bearing and the support device so that the bearing is resiliently supported, and sealing means in sealing contact with the transmission shaft and connected to the passageway of the neck portion on a side of the bearing remote from said mounting flange.

2. A structure as claimed in claim 1, wherein the body, the flange and the neck portion are all made from an elastomeric material.

3. A structure as claimed in claim 1, further comprising at least one fold portion interposed between the neck portion and the body.

4. A structure as claimed in claim 1, 2 or 3, wherein the body is substantially cylindrical and substantially rigid and spaced radially away from the articulation.

5. A structure as claimed in claim 1, 2 or 3, wherein a substantially cylindrical rigid sleeve is in engagement substantially throughout its length with the inside of the body and spaced radially away from the articulation.

6. A structure as claimed in claim 1 or 2, wherein the neck portion has an enlargement and a cavity of corresponding shape in the support device engages around the enlargement.

7. A structure as claimed in claim 1 or 2, wherein the neck portion has outer annular splines and corresponding splines are provided on said support device and engage the outer splines.

8. A structure as claimed in claim 1, wherein the bearing consists of a ring of antifriction material.

9. A structure as claimed in claim 1 or 2, wherein the sealing means are lip sealing means.

10. A structure as claimed in claim 9, further comprising inner annular grooves forming labyrinths within the lip sealing means.

11. A structure as claimed in claim 1 or 2, comprising means defining a passage for conveying lubricant from inside the body to the bearing.

12. A structure as claimed in claim 1, further comprising a removable plug which fits on the end of the body adjacent the mounting flange for transportation and storage of the device.

13. An assembly comprising in combination a bearing and a protecting device for an articulation including a shaft, the device comprising a gaiter of a deformable material having a body for surrounding the articulation, a mounting flange extending an end of the body, at least one fold interposed between the body and the flange, an elastomeric neck portion extending an end of the body remote from said mounting flange and having a passageway for receiving said shaft and an outer configuration for mounting the neck portion in a support device so as to be held longitudinally in position by the support device, said bearing being held in position in the neck portion and adapted to act as a bearing for said shaft, and sealing means for cooperation with said shaft and located on a side of the bearing remote from said mounting flange.

14. An assembly as claimed in claim 13, wherein the neck portion has a part-spherical outer configuration.

15. An assembly as claimed in claim 13, wherein the outer configuration of the neck portion includes annular shoulders.

16. An assembly as claimed in claim 13, comprising passage means in said passageway for putting the bearing in communication with the interior of the gaiter when said shaft is engaged in said bearing.

* * * * *